W. D. BAXTER.
FARM GATE.
APPLICATION FILED JULY 18, 1912.
1,047,368.
Patented Dec. 17, 1912.
2 SHEETS—SHEET 1.
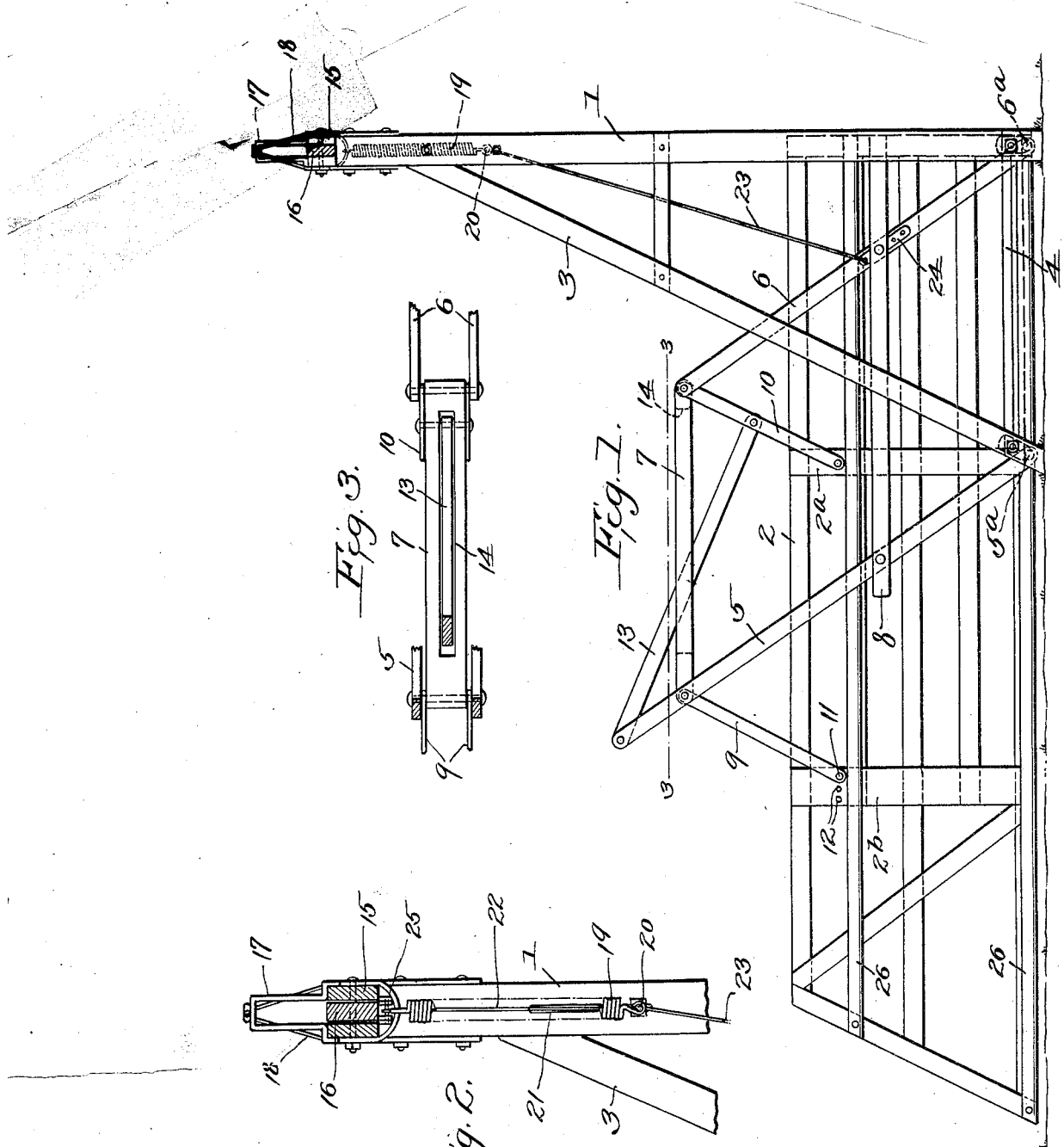
WITNESSES
INVENTOR
W. D. Baxter
Attorney

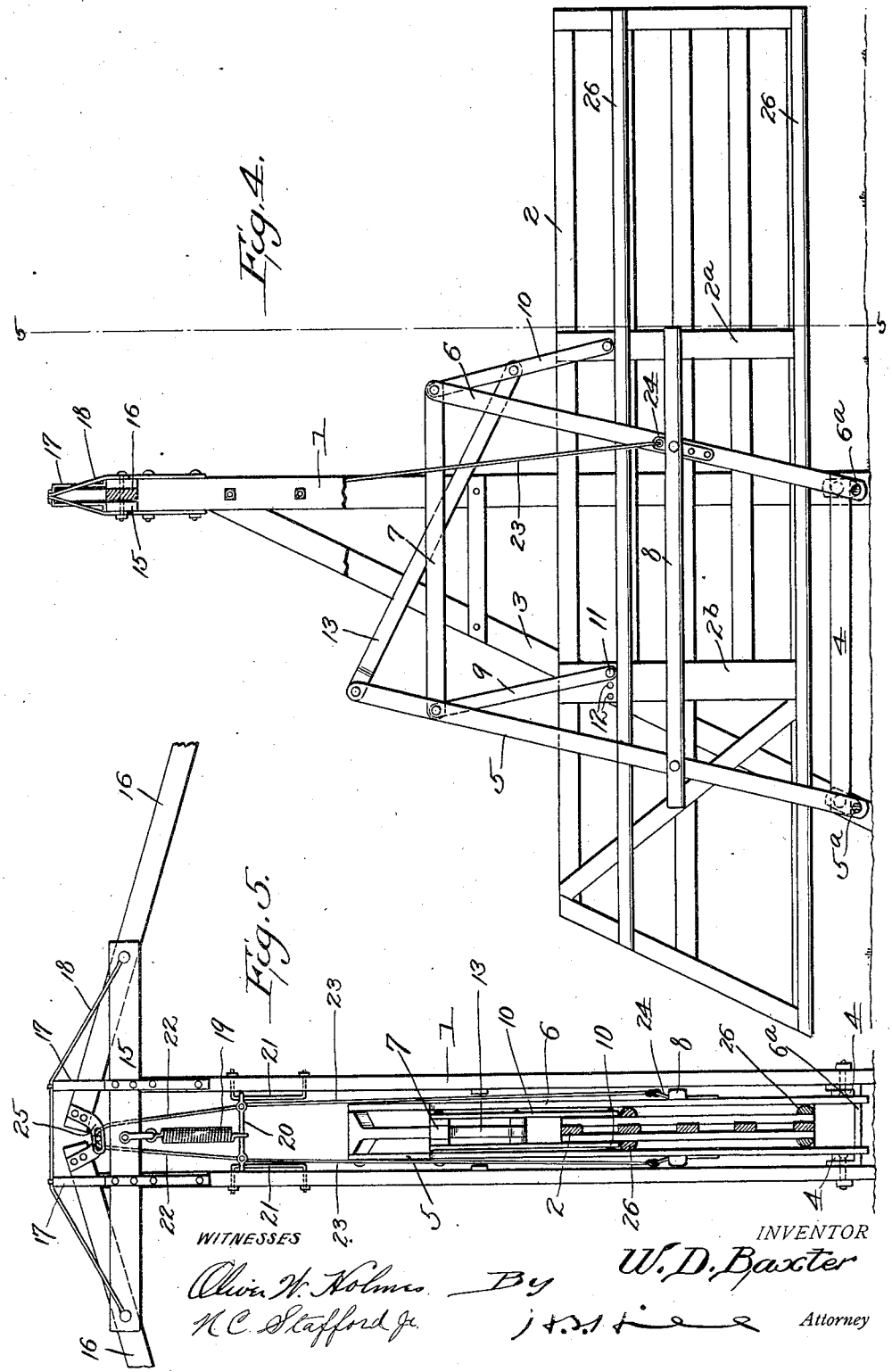

UNITED STATES PATENT OFFICE.

WILLIAM D. BAXTER, OF EWING, NEBRASKA.

FARM-GATE.

1,047,368.

Specification of Letters Patent. Patented Dec. 17, 1912.

Application filed July 18, 1912. Serial No. 710,195.

*To all whom it may concern:*

Be it known that I, WILLIAM D. BAXTER, citizen of the United States, residing at Ewing, in the county of Holt and State of Nebraska, have invented certain new and useful Improvements in Farm-Gates, of which the following is a specification.

The present invention relates to certain new and useful improvements in the construction of farm gates of that general character which embody novel features of construction whereby they can be readily opened or closed by a person upon a horse or within a vehicle without the necessity of dismounting from the horse or getting out of the vehicle, as the case may be.

The object of the invention is to provide a gate of this character which is comparatively simple and inexpensive in its construction, which comprises few and durable parts, and which can be readily operated from either side of the gate regardless of whether the gate be in an open or a closed position.

With this and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a side elevation of a farm gate constructed in accordance with the invention, the gate being shown in an open position. Fig. 2 is an enlarged vertical longitudinal sectional view through the upper portion of the supporting frame or standard. Fig. 3 is a horizontal sectional view on the line 3—3 of Fig. 1. Fig. 4 is a side elevation of the gate, the gate member being shown in an intermediate position and a portion of the supporting framework being broken away. Fig. 5 is a transverse vertical sectional view on the line 5—5 of Fig. 4.

Corresponding and like parts are referred to in the following description and indicated in all the views of the drawings by the same reference characters.

The supporting framework comprises a pair of spaced vertical standards 1 between which the gate 2 is mounted to swing both vertically and longitudinally, the said gate being withdrawn between the standards in the position shown by Fig. 1, when in an open position, and being swung outwardly so as to project beyond the standards when in a closed position. The vertical standards 1 are provided with the diagonal braces 3, the lower ends of the braces being connected to the lower ends of the respective standards by the horizontal strips 4.

The gate 2 is carried by a swinging frame which is formed with a pair of upright and substantially parallel levers 5 and 6, the lower ends of the said levers being pivotally mounted upon the stirrups or braces 5ᵃ and 6ᵃ respectively, said stirrups serving to hold the lower ends of the standards 1 and braces 3 in a properly spaced relation. As shown more clearly by Fig. 5, it will be observed that the levers 5 and 6 are each formed in duplicate, one of the members of each of the levers being arranged on each side of the gate. The upper ends of the levers 5 and 6 are connected by a link 7, while intermediate portions of the levers 5 and 6 are connected upon opposite sides of the gate by the guide strips 8. These guide strips extend longitudinally beyond the levers and are secured to the outer faces of the levers so as to be interposed between the levers and the standards 1 and braces 3 of the main frame. It will thus be obvious that the guide strips 8 serve to direct the levers 5 and 6 in their swinging movement and cause them to operate freely between the spaced standards 1 and the diagonal braces 3. A pair of substantially parallel hangers 9 and 10 are pendent from the upper ends of the levers 5 and 6, the lower ends of the said levers being pivotally connected to the gate 2. In the present instance the hanger 10 is pivotally connected to an upright 2ᵃ of the gate, while the hanger 9 is pivotally connected to an upright 2ᵇ of the gate, the said pivotal connection being brought about by means of a pivot pin 11 which is adapted to engage any selected one of the openings 12. This admits of the connection between the hanger 9 and the gate being adjusted as may be required for causing the gate to hang in a horizontal position.

The upper end of the lever 5 is extended above the link 7 where its extremity is connected by means of a rod 13 to an intermediate portion of the hanger 10, the said rod passing loosely through a slot 14 in the horizontal link 7. The two levers 5 and 6 in connection with the link 7 constitute a swinging frame which serves to carry the gate 2.

When this swinging frame is moved upwardly, as indicated by Fig. 4, the gate 2 is lifted above the ground, and as soon as the swinging frame is moved a sufficient amount to pass the dead center, the weight of the gate will cause the same to drop back upon the ground and complete the swinging movement of the frame. As the frame swings downwardly in either direction, it will be observed that the rod 13 will serve to swing the hangers 9 and 10 away from a vertical position so as to increase the longitudinal throw of the gate. When the gate reaches an open position, as shown by Fig. 1, the rod 13 inclines the hangers 9 and 10 rearwardly so as to withdraw the gate a maximum amount, while when the gate is swung into a closed position, it will be obvious that the rod 13 will serve to swing the hangers 9 and 10 in the opposite direction so as to materially increase the outward throw of the gate.

The swinging frame can be operated by hand, if desired, although it is contemplated to make provision whereby the gate can be operated by a rider or driver without the necessity of dismounting or getting out of the vehicle. The upper ends of the spaced standards 1 are connected by the spaced and transverse bars 15, the ends of the bars projecting laterally upon opposite sides of the standards and having the operating levers 16 pivotally mounted between the same. These cross bars 15 may be secured in position in any suitable manner as by means of the straps 17, intermediate portions of the straps being shown as doubled upon themselves or looped so as to provide vertical guides within which the inner ends of the levers 16 operate. The projecting ends of the cross bars 15 may be reinforced by the truss rods 18, while the middle portions of the cross bars 15 are connected by a spring 19 to a cross head 20 which is slidably mounted between the upper ends of the standards 1, the ends of the cross head being shown as slidably engaging the vertical guides 21. This cross head is connected by means of the links 22 to the inner ends of the levers 16, and also by means of the links 23 to plates 24 upon opposite sides of the lever 6. In order to cause the operating levers 16 which project upon opposite sides of the gate to always move in unison the inner ends thereof may be suitably connected in any suitable manner as by means of the loose joint 25.

In order to swing the gate from an open position to a closed position, or from a closed position to an open position, as the case may be, it is merely necessary for the operator to grasp the end of one of the operating levers 16 and pull upwardly upon the links 22 so as to raise the cross head 20. This upward movement of the cross head pulls upwardly upon the links 23 and serves to swing the lever 6 upwardly toward a vertical position. The momentum of the gate and swinging frame will serve to carry the lever 6 slightly beyond the vertical position and the weight of the gate will then act by gravity to complete the swinging movement of the frame and completely shift the position of the gate. The spring 19 normally tends to move the cross head 20 upwardly and tends to counteract the weight of the gate so as to render the operation thereof comparatively easy. When this spring 19 is strong so as to almost counteract the weight of the gate, a very slight pull upon one of the members 16 will be sufficient to operate the gate, while with a weaker spring a stronger pull upon the lever 16 would be necessary to operate the gate.

As has been previously explained, the rod or plunger 13 which connects the extended upper end of the lever 5 to the hanger 10 serves to very greatly increase the longitudinal throw of the gate so that a very slight vertical movement of the gate is sufficient to admit of the gate being easily swung from an open to a closed or from a closed to an open position, as may be desired.

It will be observed that each side of the gate 2 is provided with a pair of longitudinal guide strips 26 which project laterally therefrom, the said guide strips serving to engage the inner faces of the complemental members of the levers 5 and 6 so as to maintain ample clearance space for the longitudinal movements of the gate and cause the gate to always swing freely through the levers 5 and 6 without any binding action.

It will be observed that I have provided a gate which can be easily and quickly thrown from an open to a closed or from a closed to an open position, and that the gate is positive in its action and will not get caught at an intermediate position so as to remain in a half open and half closed position.

Having thus described the invention, what I claim as new and desire to secure by Letters Patent, is:—

1. A farm gate including spaced standards, braces for the standards, a swinging frame mounted to swing between the standards and formed in spaced sections, hangers pendent from the swinging frame, a gate supported by the hangers and adapted to swing between the spaced sections of the swinging frame, longitudinal guide strips upon the gate for holding the gate spaced from the swinging frame, longitudinal guide strips upon the swinging frame to hold the latter spaced from the standards and braces, and means for operating the swinging frame.

2. A farm gate including a main support formed with a pair of spaced and upright standards, a transverse bar connecting the top ends of said standards, a swinging frame mounted upon the support, hangers pendent from the swinging frame, a gate supported by the hangers and adapted to swing between said standards, levers pivotally mounted upon the transverse bar, links connecting said levers and swinging frame, a spring suspended from said transverse bar and having an operative connection with said links for normally tending to raise said links, whereby a portion of the weight of the gate is counteracted when the same is swung.

3. A farm gate including a main support, a pair of spaced and substantially parallel upright standards, a swinging frame mounted upon the support, a gate operatively connected to said swinging frame and adapted to be swung between said standards, a transverse bar connecting the top ends of said standards, operating levers pivoted to said transverse bar, vertical guide rods mounted on the inner face of said standards, a cross head rigidly secured to said links and slidably mounted on said guide rods, a spring connecting said transverse bar and said cross head and normally tending to raise said cross head to the top of the guides, whereby a portion of the weight of the gate is counteracted when the same is swung.

In testimony whereof I affix my signature in presence of two witnesses.

WILLIAM D. BAXTER.

Witnesses:
M. T. SANDERS,
J. L. ROLL.

---

Copies of this patent may be obtained for five cents each, by addressing the "Commissioner of Patents, Washington, D. C."